United States Patent
Echizen et al.

(10) Patent No.: US 8,728,582 B2
(45) Date of Patent: May 20, 2014

(54) PRIMERS AND A METHOD OF COATING IN WHICH THEY ARE USED

(75) Inventors: Kazuaki Echizen, Yokohama (JP); Toshiya Kitamura, Yokohama (JP)

(73) Assignee: BASF Coatings Japan Ltd. (JP)

( * ) Notice: Subject to any disclaimer, the term of this patent is extended or adjusted under 35 U.S.C. 154(b) by 970 days.

(21) Appl. No.: 12/864,310

(22) PCT Filed: Nov. 26, 2008

(86) PCT No.: PCT/IB2008/003272
§ 371 (c)(1),
(2), (4) Date: Jul. 23, 2010

(87) PCT Pub. No.: WO2009/093097
PCT Pub. Date: Jul. 30, 2009

(65) Prior Publication Data
US 2011/0003080 A1    Jan. 6, 2011

(30) Foreign Application Priority Data
Jan. 23, 2008 (JP) ................................. 2008-012335

(51) Int. Cl.
*B05D 3/02* (2006.01)
(52) U.S. Cl.
USPC .............. 427/385.5; 427/393.5; 427/407.1; 427/412.1; 524/386; 524/505
(58) Field of Classification Search
None
See application file for complete search history.

(56) References Cited

U.S. PATENT DOCUMENTS

| 6,939,916 B2 * | 9/2005 | Merritt et al. ........... 525/91 |
| 2003/0039839 A1 * | 2/2003 | Haruta et al. ........... 428/421 |
| 2004/0225054 A1 * | 11/2004 | Coca et al. ........... 524/504 |

FOREIGN PATENT DOCUMENTS

| EP | 1600484 B1 | 10/2007 |
| JP | 4372641 A | 12/1992 |
| JP | 8134400 A | 5/1996 |
| JP | 8311397 A | 11/1996 |
| JP | 8325350 A | 12/1996 |
| JP | 2000265109 A | 9/2000 |
| JP | 2002121462 A | 4/2002 |
| JP | 2005139336 A | 6/2005 |
| WO | WO2008093215 A1 | 8/2008 |
| WO | WO2008093228 A1 | 8/2008 |

OTHER PUBLICATIONS

International Search Report of International application No. PCT/IB2008/003272 dated May 12, 2009.
Written Opinion for International application No. PCT/IB2008/003272 dated May 12, 2009.
Database WPI Week 200064; Thomason Scientific, London, GB; AN 2000-659235; XP-002480184; JP2000-265109.
Database WPI Week 199708; Thomason Scientific, London, GB; AN 1997-083503; XP-002480185; JP08-325350.
Database WPI Week 199306; Thomson Scientific, London, GB; AN 1993-048661; XP-002480186; JP04-372641.
Database WPI Week 200273; Thomason Scientific, Londond, GB; AN 2002-676897; XP-002524901; JP2002-121462.
Database WPI Week 199631; Thomason Scientific, London, GB; AN 1996-306844; XP-002480183; JP08134400.
International Preliminary Report on Patentability for International application No. PCT/IB2008/003272 dated Jul. 27, 2010.

* cited by examiner

*Primary Examiner* — Erma Cameron
(74) *Attorney, Agent, or Firm* — Cantor Colburn LLP

(57) ABSTRACT

Disclosed is a primer having from 50 to 90 mass % of (A) a chlorinated polyolefin resin having a chlorine content of from 5 to 50 mass % and a weight average molecular weight of from 1,000 to 100,000, from 45 to 5 mass % of (B) a blocked polyisocyanate compound, from 45 to 5 mass % of (C) a polyol resin having a hydroxyl group value of from 30 to 120 mgKOH/g and a weight average molecular weight from 5,000 to 50,000, from 0.5 to 12 mass % of (D) a diol having a weight average molecular weight of from 120 to 1,000 and from 0.01 to 1.5 mass % of (E) a hardening catalyst, wherein the proportions are with respect to the total mass of the resin solid fraction of the (A), (B), and (C) components.

8 Claims, No Drawings

US 8,728,582 B2

PRIMERS AND A METHOD OF COATING IN WHICH THEY ARE USED

CROSS REFERENCE TO RELATED APPLICATIONS

This application is a National Phase Application of Patent Application PCT/IB2008/003272 filed on 26 Nov. 2008, which claims priority to JP 2008-012335, filed 23 Jan. 2008, both of which are hereby incorporated by reference in their entirety.

TECHNICAL FIELD

The invention concerns primers which have excellent adhesion on plastic base materials, and especially on polyolefin base materials, and which have excellent adhesion on a surface paint film when recoating (repainting) without sanding, and a method of coating in which these primers are used.

BACKGROUND OF THE INVENTION

Polyolefin moldings are often used as parts of automobile outer panels and domestic electrical goods for example, and more recently recycled polyolefin moldings have come to be reused. A primer which contains a chlorinated polyolefin is used in those cases where a two-liquid type top-coat paint which includes a polyisocyanate compound is used as the top-coat paint of a polyolefin molding in order to improve the adhesion of the top-coat paint film with the polyolefin molding. However, there is a problem in that the adhesion with the polyolefin base material is inadequate in cases where rubber products (such as styrene/butadiene rubber, isoprene rubber and the like) which have been included in polyolefin moldings and recycled polyolefin moldings to which only a small amount or no hydroxyl group containing polyolefin has been added are reused.

Furthermore, in those cases where repair-coating is carried out after a primer and a top-coat paint have been coated on a polyolefin molding, the paint film has generally been sanded to remove dirt and marks and then this part has been repainted (recoated) with primer and top-coat paint. At this time the recoating with primer and top-coat paint can be carried out on a paint film which has not been ground (unsanded) without grinding the whole surface of the paint film which is to be repaired. In such a case there is a problem in that the inter-layer adhesion of the under-layer paint film and the recoated primer is inadequate.

Paint compositions which have as essential components (A) chlorinated polyolefin resin which has a chlorine content of from 10 to 50 mass %, (B) acrylic modified chlorinated polyolefin resin, (C) acrylic resin and/or polyester resin of weight average molecular weight from 2,000 to 50,000 and hydroxyl group value from 10 to 90 mgKOH/g and (D) isocyanate compound in which the ratio of the isocyanate equivalent and the hydroxyl group equivalent [Isocyanate Equ.]/[Hydroxyl Group Equ.] is from 0.5/1.0 to 1.2/1.0 and in which, of the total mass (solid fraction) of the (A), (B) and (C) components, the (A) component accounts for from 3 to 20 mass %, the (B) component accounts for from 5 to 40 mass % and the (C) component accounts for from 40 to 92 mass % are known as two-liquid type paint compositions which have an excellent high gloss appearance, weather resistance, solvent resistance and coating operability as well as providing excellent adhesion on being coated directly without the application of a primer on polyolefin moldings with which adhesion is difficult to achieve (for example, see Japanese Unexamined Patent Application Laid Open 2005-139336). However, since these combine the function of a primer and the function of a top-coat paint the adhesion with polyolefin base material moldings is inadequate and, furthermore, there is a problem with the pot-life of these two-liquid type paints.

Furthermore, resin compositions for coating purposes which have good adhesion on polyolefin base materials which are characterized in that they include as essential components (1) polymer which has acetoacetoxy groups in a side chain which has been obtained by polymerizing or copolymerizing an acetoacetoxy group containing monomer with other copolymerizable monomer, as required, in the presence of from 5 to 50 parts by weight of a chlorinated polyolefin resin of chlorine content from 15 to 50 wt % and (2) isocyanate compound are known as resin compositions for coating purposes with which paint films which have excellent adhesion, hot water resistance and gasoline resistance can be formed and which also have excellent paint storage stability and which can be coated directly without the need for any pre-treatment such as coating with primer etc. on polyolefin base material moldings (for example, see Japanese Unexamined Patent Application Laid Open H8-311397). However, these resin compositions for coating purposes are two-liquid type paints and there are problems with the pot-life.

Furthermore, a primer for use on plastic which is characterized in that it contains (A) chlorinated polyolefin which has a chlorine content of from 16 to 22 wt % and of which the weight molecular weight is from 30,000 to 120,000, (B) blocked polyisocyanate where an isocyanurate type aliphatic and/or alicyclic polyisocyanate has been blocked with malonic acid di-alkyl ester and acetoacetic acid ester and (C) polyol resin is known as a primer for use on plastics which has excellent adhesion on polyolefin base material moldings and excellent recoat adhesion on paint films (for example, see Japanese Unexamined Patent Application Laid Open 2002-121462). However, although the adhesion is good with the polyolefin based base material molding and paint films which have been sanded, there is a problem in that the recoat adhesion is inadequate in the absence of sanding.

[Patent Citation 1]
Japanese Unexamined Patent Application Laid Open 2005-139336
[Patent Citation 2]
Japanese Unexamined Patent Application Laid Open H8-311397
[Patent Citation 3]
Japanese Unexamined Patent Application Laid Open 2002-121462

The present invention is intended to provide primers which have excellent adhesion on plastic base materials, and especially on polyolefin base materials, and which have excellent inter-layer adhesion with underlying paint films, and especially urethane resin-based top-coat paint films, on recoating (repainting), and to provide a method of coating in which these primers are used.

Means of Resolving these Problems

As a result of thorough research carried out with a view to resolving the abovementioned problems, the inventors have discovered that by adding a low molecular weight diol and a hardening catalyst to a composition which contains specified chlorinated polyolefin resin, specified hydroxyl-group containing polymeric polyol resin and blocked polyisocyanate compound the recoat adhesion on a molding comprising a plastic base material such as a polyolefin base material or a paint film is greatly improved, and the invention is based upon this discovery.

That is to say, the present invention provides a primer which is characterized in that it contains (A) chlorinated polyolefin resin which has a chlorine content of from 5 to 50 mass % and a weight average molecular weight of from 1,000 to 100,000, (B) blocked polyisocyanate compound, (C) polyol resin which has a hydroxyl group value of from 30 to 120 mgKOH/g and a weight average molecular weight of from 5,000 to 50,000, (D) diol of weight average molecular weight from 120 to 1,000 and (E) hardening catalyst and the proportions with respect to the total mass of resin solid fraction of the (A), (B) and (C) components included are from 50 to 90 mass % of the (A) component, from 45 to 5 mass % of the (B) component, from 45 to 5 mass % of the (C) component, from 0.5 to 12 mass % of the (D) component and from 0.01 to 1.5 mass % of the (E) component.

Furthermore, the invention provides a method of coating plastic moldings which is characterized in that the abovementioned primer and a top-coat paint are coated sequentially on a plastic molding and baked and hardened and a top-coat paint film is formed.

Furthermore, the invention provides a method of coating plastic moldings which is characterized in that the aforementioned primer and a top-coat paint are coated sequentially on a plastic molding and baked and hardened and then the abovementioned primer and a top-coat paint are coated sequentially on the top-coat paint film and baked and hardened.

Furthermore, the invention provides a method of coating moldings which is characterized in that the abovementioned primer and a top-coat paint are coated sequentially on the top-coat paint film of a molding on which a top-coat paint has been coated and hardened and a top-coat paint film has been formed, and then baked and hardened.

Furthermore, the invention provides a method of coating moldings in which, in the abovementioned method of coating moldings, the top-coat paint is a one-coat type two-liquid type urethane resin paint.

Furthermore, the invention provides a method of coating moldings in which, in the abovementioned methods of coating moldings, the top-coat paint film comprises two layers, namely a base-coat paint film and a clear paint film, and at least the clear paint is a two-liquid type urethane resin paint.

Furthermore, the invention provides a method of coating moldings as claimed in which, in the abovementioned method of coating moldings, the top-coat paint film comprises three layers, namely a colored based coat paint film, a pearl base-coat paint film and a clear paint film, and at least the clear paint is a two-liquid type urethane resin paint.

DETAILED DESCRIPTION OF A PREFERRED EMBODIMENT OF THE INVENTION

By using a primer of this invention it is possible to obtain paint films where the adhesion of the primer paint film on a plastic base material, and especially on a polyolefin base material, is excellent and which have excellent inter-layer adhesion of the primer paint film and the urethane resin-based top-coat paint film which forms the base when recoating (repainting).

The (A) component chlorinated polyolefin resin which is used in the invention has a chlorine content of from 5 to 50 mass %, preferably of from 15 to 35 mass %, and most desirably of from 18 to 25 mass %. In those cases where the chlorine content exceeds 50 mass % the adhesion with a plastic base material, and especially a polyolefin base material, or a paint film is poor, and in those cases where the chlorine content is less than 5 mass % the solubility in solvents is reduced and problems arise with storage stability.

Furthermore, the weight average molecular weight of the (A) component chlorinated polyolefin resin is from 1,000 to 100,000, preferably from 5,000 to 90,000, and most desirably from 10,000 to 80,000. If the weight average molecular weight exceeds 100,000 then problems arise in that the coating operability become poor, and in those cases where it is less than 1,000 the resin itself lacks cohesive strength and so a problem arises in that a normal paint film cannot be obtained.

Resins where a polymer resin which has polyolefin resin as the main skeleton has been modified with chlorine can be cited as examples of the (A) component chlorinated polyolefin resin. As well as polyethylene resins, polypropylene resins and the like, modified polyolefin resins which have been modified with maleic anhydride or the like, and polyolefin-based polymer compounds which have hydroxyl groups, carboxyl groups, methacryloyl groups, acryloyl groups or epoxy groups, for example, at the ends of the molecules or in the molecular chains can also be cited as examples of the polyolefin resin.

Actual examples of the (A) component chlorinated polyolefin resins include chlorinated polyethylene resins, chlorinated polypropylene resins, chlorinated ethylene/propylene copolymers, chlorinated ethylene/vinyl acetate copolymers and modified resins where acid anhydrides such as maleic anhydride and the like have been copolymerized in these chlorinated polyolefin resins.

Furthermore, a commercial product can be used for the (A) component chlorinated polyolefin resin. Examples of such commercial products include Superclon 773H, Superclon 822, Superclon 892L, Superclon 832L, Superclon E (produced by the Nippon Seishi Chemical Co.), Hardren 14LLB, Hardren CY9122, Hardren HM-21 and Hardren 13-MLJ (produced by the Toyo Kasei Kogyo Co.).

The (B) component blocked polyisocyanate compound which is used in the invention is a compound where the isocyanate groups of a polyisocyanate compound which has two or more isocyanate groups in one molecule have been blocked with a blocking agent. When the blocking agent is eliminated the blocked polyisocyanate compound can be expected to react with the (C) component polyol resin. Furthermore, it ensures compatibility of the (A) component chlorinated polyolefin resin and the (C) component polyol resin and fulfils the role of raising the affinity with a top-coat paint film.

No particular limitation is imposed upon the polyisocyanate compound provided that it is one which has been used conventionally in coating applications, and various types of polyisocyanate can be used. Various types of polyisocyanate such as the aromatic polyisocyanates and aliphatic or alicyclic polyisocyanates, for example, can be used as polyisocyanates of this type. Toluene diisocyanate (TDI), 4,4-diphenylmethane diisocyanate (MDI), xylene diisocyanate (XDI), hexamethylene diisocyanate (HDI), lysine diisocyanate (LDI), 2-isocyanatoethyl 2,6-diisocyanato-caproate (LTI), isophorone diisocyanate (IPDI), trimethylhexamethylene diisocyanate (TMDI), hydrogenated xylene diisocyanate (HXDI) and the like can be cited as preferred examples of such polyisocyanates. Furthermore, the polyisocyanates can be used as prepolymers of the biuret type, the adduct type or the isocyanurate type for example. The use of an aliphatic polyisocyanate is preferred from the viewpoint of weather resistance. One type of polyisocyanate can be used on its own, or a mixture of polyisocyanates can be used.

The blocking agent which is used as the blocking agent of the polyisocyanate compound can be selected appropriately according to the elimination temperature, and examples include oximes, active methylene compounds, malonic acid dialkyl esters, acetoacetic acid esters, ε-caprolactam, β-diketone and the like. One type of blocked polyisocyanate compound can be used alone, or a mixture of these compounds can be used.

The (C) component diol which is used in this invention raises the adhesion of the primer paint film on a top-coat paint film and in a case where a hardening agent is used in the top-coat paint, and especially where the top-coat paint is a urethane resin-based paint, it fulfils the role of heightening the cohesive strength by reacting with the polyisocyanate which migrates from the urethane resin-based paint.

The (C) component polyol resin has a hydroxyl group value of from 30 to 120 mgKOH/g, and preferably of from 40 to 70 mgKOH/g, and weight average molecular weight of from 5,000 to 50,000, and preferably of from 7,000 to 20,000. If the hydroxyl group value of said polyol resin is less than 30 mgKOH/g then adhesion is reduced due to the inadequate crosslink density of the paint film which is obtained, and if it exceeds 120 mgKOH/g then the storage stability of the primer is reduced due to the lowering of compatibility with the chlorinated polyolefin resin (A) and so this is undesirable. Furthermore, if the weight average molecular weight of the (C) component polyol resin is less than 5,000 then an adequately crosslinked paint film is not obtained and the adhesion is inadequate, and if it exceeds 50,000 then compatibility with the chlorinated polyolefin resin is reduced with a resulting lowering in operability when coating. Furthermore, the (C) component polyol resin has an acid value preferably of from 0 to 25 mgKOH/g and most desirably of from 0 to 10 mgKOH/g. If the acid value of the (C) component polyol resin exceeds 25 mgKOH/g then compatibility with the chlorinated polyolefin resin is reduced with the result that the storage stability of the paint is reduced and so this is undesirable.

Various polyol resins which have the abovementioned properties can be used for the (C) component polyol resin, and these include acrylic polyol resins and polyester polyol resins. The acrylic polyol resins can be obtained by means of polymerization or copolymerization based on polymerizable unsaturated monomers which contain a hydroxyl group with (meth)acrylic acid esters and/or other copolymerizable monomers, as required.

Examples of the polymerizable unsaturated monomers which contain a hydroxyl group include hydroxyethyl (meth)acrylate, hydroxypropyl (meth)acrylate, hydroxybutyl(meth)acrylate, 1,4-butanediol mono-(meth)acrylate and the like. Furthermore, the alkyl alcohol residues which have from 1 to 18 carbon atoms with which the (meth)acrylates are formed may be any alcohol residue which has a linear chain, branched chain or cyclic alkyl group. One of these may be used, or a combination of two or more types can be used.

Actual examples of copolymerizable (meth)acrylic acid based esters include (meth)acrylic acid alkyl esters such as methyl(meth)acrylate, ethyl(meth)-acrylate, n-propyl(meth)acrylate, isopropyl(meth)-acrylate, n-butyl(meth)acrylate, isobutyl(meth)-acrylate, t-butyl(meth)acrylate, pentyl(meth)-acrylate, hexyl(meth)acrylate, cyclohexyl(meth)-acrylate, 2-ethylhexyl(meth)acrylate, dodecyl (meth)acrylate and the like; cyclic hydrocarbon esters of (meth)acrylic acid such as adamantyl methacrylate, isobornyl(meth)acrylate and the like; and aromatic hydrocarbon esters of (meth) acrylic acid such as phenyl (meth)acrylate and the like. One of these can be used, or a combination of two or more types can be used.

Other copolymerizable polymerizable unsaturated monomers include Hosmer (trade name, produced by the Unichemical Co.), epoxy group containing (meth)acrylates such as glycidyl(meth)acrylate 3,4-epoxycyclohexylmethyl methacrylate, allyl methacrylate 3,4-epoxycyclohexylmethyl acrylate and the like; polymerizable double bond containing aromatic compounds such as styrene, α-methylstyrene, p-vinyltoluene and the like; acrylamide compounds such as methacrylamide, acrylamide, N,N-dimethylmethacrylamide N,N-dimethylacrylamide and the like, 2,2,6,6-tetramethyl-4-piperidyl acrylate; and aliphatic vinyl ether compounds such as ethyl vinyl ether, isopropyl vinyl ether, n-propyl vinyl ether, n-butyl vinyl ether, isobutyl vinyl ether, 2-ethylhexyl vinyl ether, cyclohexyl vinyl ether and the like.

Moreover, they also include 2,3-dihydrofuran; trimethoxysilylpropyl(meth)acrylate; maleic acid anhydride esters, itaconic acid anhydride esters, maleic acid esters, fumaric acid esters; acrylonitrile; allyl group containing compounds such as allyl glycidyl ether; alkyl esters of crotonic acid such as methyl crotonate, ethyl crotonate, propyl crotonate and the like; aliphatic carboxylic acid vinyl esters such as vinyl acetate, vinyl propionate, vinyl butyrate, vinyl pivalate, vinyl crotonate, vinyl caprylate, vinyl caproate, vinyl laurate, vinyl stearate and the like; alicyclic carboxylic acid vinyl esters such as vinyl cyclohexanecarboxylate and the like; and aromatic carboxylic acid vinyl esters such as vinyl benzoate, vinyl cinnamate, vinyl p-t-butylbenzoate and the like.

Furthermore, the other copolymerizable monomers also include methacrylic acid, acrylic acid, itaconic acid, mesaconic acid, maleic acid, fumaric acid, ω-carboxy-polycaprolactone (n=2) mono-acrylate (for example, Aronix M-5300 (trade name, produced by the Toa Gosei Kagaku Kogyo Co.)), phthalic acid mono-hydroxyethyl acrylate (for example, Aronix M-5400 (trade name, produced by the Toa Gosei Kagaku Kogyo Co.)) and acrylic acid dimer (for example, Aronix M-5600 (trade name, produced by the Toa Gosei Kagaku Kogyo Co.)). One of these can be used, or a combination of two or more types can be used.

The copolymerizable (meth)acrylic acid esters and other copolymerizable unsaturated monomers are not essential components, and they can be selected and used appropriately, as required, in the design of a paint film in accordance with the base material and the intended use.

No particular limitation is imposed upon the method of polymerizing or copolymerizing the polymerizable unsaturated monomers which contain a hydroxyl group and, for example, the known methods such as solution polymerization in an organic solvent, suspension polymerization, emulsion polymerization, bulk polymerization, precipitation polymerization and the like can be used. Furthermore, neither is any particular limitation imposed on the polymerization system and, for example, radical polymerization, cationic polymerization or anionic polymerization can all be used.

From among these methods, radical polymerization is ideal from the industrial point of view. Organic peroxides such as t-butyl hydroperoxide, cumene hydroperoxide, t-butyl peroxyneodecanoate, t-butyl methyl ethyl ketone peroxide and the like, or azo-based initiators such as 2,2'-bisazo(2,4-dimethyl-valeronitrile), 2,2'-azobis(2-methylpropionitrile) (AIBN), 2,2'-azobis(2-methyl)butyronitrile) and the like, can be cited as preferred examples of polymerization initiators which can be used for radical polymerization. Of course, the initiator is not limited to these examples. One of these radical polymerization initiators can be used, or a combination of two or more types can be used.

A reaction temperature during radical polymerization of from 60 to 150° C. is generally preferred. If the temperature is less than 60° C. then the radical polymerization initiator is unlikely to break down and the reaction is unlikely to proceed, and if it exceeds 150° then even though the radical polymerization initiator is broken down and radicals are produced, they have a very short lifetime and it is unlikely that the growth reaction will proceed effectively. The polymerization time is dominated by the reaction temperature and other conditions and cannot be fixed generally, but a time of from 2 to 6 hours is generally satisfactory.

Furthermore, the (C) component polyester polyol resins can be obtained by reacting polybasic acids with polyhydric alcohols. Examples of the polybasic acids include phthalic acid anhydride, tetrahydrophthalic acid anhydride, isophthalic acid, maleic acid anhydride, fumaric acid, trimellitic acid anhydride, methylenetricyclohexene tricarboxylic acid anhydride, pyromellitic acid anhydride, itaconic acid, adipic acid, sebacic acid, azelaic acid, hexahydrophthalic acid anhydride, hymic acid anhydride, succinic acid anhydride, hettoic acid anhydride and the like. One type of polybasic acid can be used or two or more types can be used. Examples of the polyhydric alcohols include ethylene glycol, diethylene glycol, triethylene glycol, propylene glycol, neopentyl glycol, butylene glycol, hexanediol, trimethylolethane, trimethylolpropane, pentaerythritol, dipentaerythritol, sorbitol and the like, and the lactone, such as caprolactone, adducts of these alcohols. One type of polyhydric alcohol can be used, or two or more types can be used.

Moreover, said polyester polyol resins can also be modified with mono-basic acids, fatty acids, oil components and the like. Moreover, the introduction of hydroxyl groups into said polyester polyol resins is carried out easily by means of polyhydric alcohols which have three or more hydroxyl groups in one molecule.

One type of (C) component polyol resin can be used, or a combination of two or more types can be used.

In the invention of the present application the proportions of the (A) component, the (B) component and the (C) component included are such that, with respect to the total mass of the (A) component, the (B) component and the (C) component, there is from 50 to 90 mass % of the (A) component, from 45 to 5 mass % of the (B) component and from 45 to 5 mass % of the (C) component. Preferably there is from 60 to 80 mass % of the (A) component, from 30 to 10 mass % of the (B) component and from 30 to 10 mass % of the (C) component.

Here the abovementioned proportions of the (A) component, the (B) component and the (C) component included are the proportions of the resin solid fractions of the (A) component, the (B) component and the (C) component included respectively. Moreover, the resin solid fractions are the residues on heating measured using the method described in JIS K5601-1-2.

In those cases where the (A) component is less than 50 mass % the adhesion of the primer paint film on a plastic base material is reduced, and in those cases where the (A) component exceeds 90 mass % the adhesion of the primer paint film with a top-coat paint film is reduced. In those cases where the (B) component is less than 5 mass % the adhesion of the primer paint film with a top-coat paint film is reduced, and in those cases where the (B) component exceeds 50 mass % the adhesion of the primer, paint film on a plastic base material is reduced. In those cases where the (C) component is less than 5 mass % the adhesion of the primer paint film with a top-coat paint film is reduced, and in those cases where the (C) component exceeds 50 mass % the adhesion of the primer paint film on a plastic base material is reduced.

The (D) component diol which is used in the invention fulfils the role of improving the ability of the chlorinated polyolefin resin to wet a plastic material and, when recoating, it fulfils the role of heightening the ability to wet a top-coat film, and especially a urethane resin-based top-coat paint film, which forms the base, and heightens adhesion. In those cases where unreacted isocyanate compound remains in the vicinity of the interface with the primer in a urethane resin-based top-coat paint film which forms the lower layer which is in contact with the primer, the diol which has a lower molecular weight than the (C) component polyol, simply on the basis of its high mobility, migrates in the primer paint film to the vicinity of the interface and there is great potential for it to react with the unreacted isocyanate compound and it is thought that this has a pronounced effect which improves the inter-layer adhesion between the primer paint film and the top-coat paint film on recoating.

The weight average molecular weight of the (D) component diol is from 120 to 1,000, and preferably from 120 to 800. In those cases where the weight average molecular weight of the (D) component diol is less than 120 the storage stability of the primer is reduced due to reduced solubility in the main aromatic based solvent, and this is undesirable. In those cases where the weight average molecular weight exceeds 1,000 no improving effect on the adhesion on a top-coat paint film, and especially a urethane resin-based top-coat paint film, which forms a lower layer is observed.

Actual examples of the (D) component low molecular weight diol include dipropylene glycol, triethylene glycol, hydrogenated bisphenol A and the like. Furthermore, diols which are the reaction products of dibasic acids and an excess of a diol, and lactone, such as caprolactone, adducts with these diols and the like can also be used as the (D) component low molecular weight diol. Actual examples of the diols include ethylene glycol, diethylene glycol, triethylene glycol, propylene glycol, dipropylene glycol, butane-diol, neopentyl glycol, pentanediol, hexanediol, heptanediol, octanediol, butylethylpropanediol, cyclo-hexanediol, cyclohexanedimethanol and phenyldimethanol. Examples of the dibasic acids include malonic acid, succinic acid, glutaric acid, adipic acid, pimelic acid, suberic acid, azeleic acid, sebacic acid, terephthalic acid, isophthalic acid, hexahydro-terephthalic acid, maleic acid, fumaric acid and the like, and the acid anhydrides of these dibasic acids. Furthermore, they may also be modified with monoglycidyl compounds such as butyl glycidyl ether, 2-ethylhexyl glycidyl ether, sec-butylphenol glycidyl ether, neodecanoic acid glycidyl ester and the like which include a mono-glycidyl group.

In this invention, the proportion of the (D) component included is from 0.5 to 12 mass %, preferably 10, from 1 to 10 mass %, and most desirably from 1.5 to 8 mass %, with respect to the total mass of the resin solid fraction of the (A) component, the (B) component and the (C) component. If the proportion of the (D) component included is less than 0.5 mass % then the adhesion of the primer paint film on a top-coat paint film, and especially a urethane resin-based top-coat paint film, which forms the base is inadequate, and in those cases where it exceeds 12 mass % the storage stability of the primer falls as the compatibility with the main chlorinated polyolefin resin which forms the (A) component falls, and this is undesirable.

Moreover, the proportion of the (D) component included is the proportion of the effective component of the (D) component included, and here the effective component in those cases where it has been diluted with a solvent or the like means the component not including the solvent or the like.

The (E) component hardening catalyst which is used in the invention should be a catalyst which promotes the reaction of the (D) component diol with the reactive component which is included in a top-coat paint film which forms the base and a catalyst which is used in urethane resins is especially desirable. In those cases where the top-coat paint film which forms the base is a urethane resin-based paint film the reaction of the hydroxyl groups of the primer layer of the recoat with the unreacted isocyanate of the urethane resin-based top-coat paint film which forms the base is promoted and the adhesion at the time of unsanded recoating is improved.

In practical terms, the (E) component hardening catalyst is, for example, a tin compound or a zinc compound. Examples of tin compounds include tin halides such as tin chloride, tin bromide and the like and organo-tin compounds such as dibutyltin diacetate, dibutyltin dilaurate and the like, and examples of zinc compounds include zinc halides such as zinc chloride, zinc bromide and the like and zinc salts of organic acids such as zinc octylate, zinc laurate and the like. One type of tin compound or zinc compound, or a combination of two or more types, may be used for the hardening reaction catalyst, and other hardening reaction catalysts may be used conjointly.

In this invention the proportion of the (E) component included is from 0.01 to 1.5 mass %, preferably from 0.02 to 1.0 mass %, and most desirably from 0.05 to 0.8 mass % with respect to the total mass of the resin solid fraction of the (A) component, the (B) component and the (C) component. If the proportion of the (E) component is less than 0.01 mass % then the promoting effect on the hardening reaction is not realized satisfactorily, and in those cases where it exceeds 1.5 mass % a reduction in the recoat adhesion thought to be due to excessive hardening of the paint film arises, and this is undesirable.

Moreover, the proportion of the (E) component included is the proportion of the effective component of the (E) component which is included and the effective component in cases where it has been diluted with a solvent or the like means the component not including the solvent or the like.

Color pigments, true pigments, organic solvents and various types of additive can be used, as required, in a primer of this invention. Examples of color pigments include organic pigments such as the azo-lake based pigments, phthalocyanine pigments, indigo-based pigments, perynone-based pigments, perylene-based pigments, quinophthalone-based pigments, dioxazine-based pigments, quinacridone-based pigments and the like and inorganic pigments such as chrome yellow, yellow iron oxide, red iron oxide, titanium dioxide and the like. The true pigments include kaolin, talc and the like.

Furthermore, no particular limitation is imposed upon the organic solvent provided that the various components can be dissolved therein, but those which do not react with isocyanate compounds are preferred. Examples include aliphatic hydrocarbons such as n-hexane, n-heptane, n-octane and the like, aromatic hydrocarbons such as benzene, toluene, xylene and the like, halogenated hydrocarbons such as chloroform, carbon tetrachloride and the like, alcohols such as methanol, ethanol, n-propyl alcohol, isopropyl alcohol, n-butyl alcohol and the like, ethers such as dibutyl ether, tetrahydrofuran, 1,4-dioxane and the like, ketones such as acetone, methyl ethyl ketone, methyl isobutyl ketone and the like, and esters such as ethyl acetate, n-propyl acetate, n-butyl acetate and the like. One of these solvents may be used, or a combination of two or more types can be used. No particular limitation is imposed upon the method of compounding the various components or the method of adding luster pigments, color pigments, organic solvents and the various types of additive and resin, and a variety of methods can be used, and the order of mixing and the addition order can also be varied.

Coating with a coating machine as generally used, such as a machine of the air spray, airless spray, electrostatic air spray, flow-coating or dip-coating type for example, or with a brush, after adjusting the primer to the desired viscosity by warming and adding organic solvent, as required, can be used as a suitable method of coating in which a primer of this invention is used, but air spray coating is preferred. The dry paint film thickness of the primer paint film is preferably of from 2 to 15 µm and most desirably of from 4 to 10 µm.

After coating a primer of this invention the top-coat paint is preferably coated wet-on-wet without baking the primer. The top-coat paint may be a paint of the one-coat type, the two-coat type or the three-coat type, but a two-liquid type urethane resin paint is preferred for the paint which forms the uppermost paint film layer. No particular limitation is imposed upon the urethane resin-based top-coat paint, but it should be such that the paint film is formed by the reaction between a polyol and an isocyanate compound.

The top-coat paints of the one-coat type may be solid paints or paints which have a metallic tone. The dry paint film thickness of the top-coat paint is preferably from 15 to 40 µm, and most desirably from 20 to 35 µm. The two-coat type paints are generally combinations of a colored base-coat paint or a pearlescent base-coat paint, such as a metallic base-coat paint, and a clear paint, and the dry paint film thickness of the base-coat paint is preferably from 10 to 20 µm and the dry film thickness of the clear paint is preferably from 20 to 40 µm, and most desirably from 25 to 35 µm. The three-coat type paints are generally combinations of a colored base-coat paint, a pearlescent base-coat paint and a clear paint, and the dry paint film thickness of the colored base-coat paint is preferably from 5 to 15 µm, the dry film thickness of the pearlescent base-coat paint is preferably from 5 to 15 µm, and the dry film thickness of the clear paint is preferably from 20 to 40 µm, and most desirably from 25 to 35 µm. In those cases where these paints are over-painted they are preferably all painted wet-on-wet in the unhardened state.

Baking and drying conditions for a urethane resin-based top-coat paint of from 5 minutes to 3 days at from 20 to 150° C. are preferred, and conditions of from to 30 minutes at from 80 to 140° C. are most desirable.

The moldings which are coated with a primer of this invention may be, for example, moldings comprising polyolefin base materials such as polyethylene, polypropylene and the like, and plastic base materials which include polyolefins and the like. Moreover, the primer can also be used on moldings comprising plastic base materials such as ABS resin, PC resin, nylon and the like.

Recoating (repainting) in this invention includes, for example, methods in which a primer of this invention and a top-coat paint are coated sequentially and on a molding on which a top-coat paint has been coated and hardened to form a top-coat paint film, baked and hardened, and methods in which recoating is carried out in those cases where dust has been deposited or there is failure of the paint film after a primer of this invention and a top-coat paint have been coated sequentially on a plastic molding and baked and hardened. In this case said primer is coated again after removing the dust and without sanding the whole top-coat paint film and the primer and the top-coat paint should be coated sequentially and baked in essentially the same way as on the first occasion. Furthermore, recoating (repainting) can be carried out even if part of the top-coat paint film which forms the base has peeled away, and a paint film which has excellent adhesion can be obtained by coating the primer and top-coat paint sequentially and baking.

Examples of coated objects which can be obtained with the method of coating of this invention include structural materials, metal products, plastic products, rubber products and the like. In more practical terms these include automobiles and automobile parts (for example bodies, bumpers, spoilers, mirrors, wheels, interior decorative parts and the like, which are made of a variety of materials), metal sheets such as steel sheets, bicycles, bicycle parts, materials used on roads (for example guard rails, traffic signs, sound-deadening walls and the like), materials used in tunnels (for example side wall panels and the like), ships, railway rolling stock, aircraft, musical instruments, domestic electrical goods, building materials, containers, office accessories, sports accessories, toys and the like.

EXAMPLES

The invention is described in more practical terms below by means of examples of production, illustrative examples and comparative examples. Moreover, the invention is not limited by these illustrative examples. While it is not indicated specifically, hereinafter the terms "parts" and "%" signify "parts by mass" and "mass %" respectively. Furthermore, in Tables 1 to 6 the units of the numerical values which indicate the amount of each component compounded are parts by mass.

Moreover, in the examples and comparative examples the evaluation of the various features was carried out using the methods outlined below.
<Method of Evaluating Paints and Paint Films>
(Primer Storage Stability)

The primer was stored for 10 days at 40° C. and its state was evaluated on the basis of the following criteria.
◯: No abnormality observed
Δ: Slight separation observed
X: Pronounced separation observed
(Primer Coating Operability)

The surface of a commercial black polypropylene plate (length 70 mm×width 150 mm×thickness 3 mm) was wiped with isopropyl alcohol and the dust and contamination which had been deposited on the sample for coating were removed. Then the viscosity of the primer shown in Table 4 or 5 was adjusted with xylene to 11 seconds with Ford cup #4 (20° C.) and coated with an air sprayer and the coating operability was evaluated in accordance with the criteria indicated below.
◯: No abnormality, coating was possible
X: Coating impossible due to coagulation of the paint, or a cobweb state arose during coating and normal coating was impossible
(Adhesion of First Top-Coat Paint)

A top-coat paint of which the viscosity had been adjusted to 12 seconds with Ford cup #4 (25° C.) using a diluting solvent (butyl acetate/xylene=70/30 (ratio by mass) solvent mixture) was air-spray-coated wet-on-wet over a primer paint film which had been coated in such a way as to form a dry-film thickness of from 6 to 8 μm on a commercial black polyolefin plate essentially as described above and left to stand for 5 minutes at room temperature and then maintained at 90° C. for 20 minutes and dried. The coating was carried out wet-on-wet in all cases, including the two-coat and three-coat types, in such a way that the dry paint film thickness of the top-coat paint was 25 μm in the case of a one-coat type paint, and in the case of the base paint of a two-coat type the dry paint film thickness was 15 μm, in the case of the colored base coat paint of a three-coat type the dry paint film thickness was 10 μm and in the case of the pearl base coat paint of a three-coat type the dry paint film thickness was 8 μm, and in the case of the clear paint the dry paint film thickness was 30 μm. For testing, the coated sheets obtained were left to stand for 60 minutes at room temperature and then 11 cuts were made with a cutter knife in the paint film in the length and width directions with a spacing of 2 mm to provide 100 squares, peeling was carried out with cellophane tape and the state of peeling was evaluated on the basis of the criteria indicated below.
◯: No peeling of the paint film (100/100 expressed as remaining squares)
Δ: Part of the paint film peeled off (from 90/100 to 99/100 expressed as remaining squares)
X: Peeling of the paint film (from 0/100 to 89/100 expressed as remaining squares)

In those cases where peeling of the paint film was observed the site of the peeling was confirmed as being between the base and the primer paint film or between the primer paint film and the top-coat paint film.
(Adhesion of Recoat Top-Coat Paint with First Top-Coat Paint)

A top-coat paint of which the viscosity had been adjusted to 12 seconds with a Ford cup #4 (25° C.) using a diluting solvent (butyl acetate/xylene=70/30 (ratio by mass) solvent mixture) was air-spray-coated wet-on-wet over a primer paint film which had been coated in such a way as to be from 6 to 8 μm on a commercial black polyolefin plate essentially as described above and left to stand for 5 minutes at room temperature and then maintained at 100° C. for 40 minutes and dried. The coating was carried out wet-on-wet in all cases, including the two-coat and three-coat types, in such a way that the dry paint film thickness of the top-coat paint was 25 μm in the case of a one-coat type paint, and in the case of the base paint of a two-coat type the dry paint film thickness was 15 μm, in the case of the colored base coat paint of a three-coat type the dry paint film thickness was 10 μm and in the case of the pearl base coat paint of a three-coat type the dry paint film thickness was 8 μm, and in the case of the clear paint the dry paint film thickness was 30 μm. The coated sheet was left to stand for 24 hours at room temperature and then the primer and top-coat paint were coated wet-on-wet with an air spray in essentially the same way as on the first occasion and left to stand for 5 minutes at room temperature and dried for 20 minutes at 80° C.

For testing, the coated sheets obtained were left to stand for 60 minutes at room temperature and then 11 cuts were made with a cutter knife in the paint film in the length and width directions with a spacing of 2 mm to provide 100 squares, peeling was carried out with cellophane tape and the state of peeling was evaluated on the basis of the criteria indicated below.
◯: No peeling of the paint film (100/100 expressed as remaining squares)
Δ: Part of the paint film peeled off (from 90/100 to 99/100 expressed as remaining squares)
X: Peeling of the paint film (from 0/100 to 89/100 expressed as remaining squares)
Example of Resin Production 1 (Production of a Diol Resin Solution)

1,6-Hexanediol (561 parts) and 347.1 parts of adipic acid were introduced into a glass flask of capacity 2 L which had been furnished with a thermometer and a stirrer and, after slowly raising the temperature to 140° C., the temperature was raised to 190° C. over a period of 3 hours. The mixture was maintained at 190° C. for 2 hours and the esterification reaction proceeded, and then the temperature was raised to 210° C. over a period of 2 hours and the esterification reaction was carried out until the resin acid value fell below 1. The resin so obtained was cooled, 91.9 parts of xylene were added and the diol resin solution D-1 of weight average molecular weight 330 and resin solid fraction (effective component) 90 mass % was obtained.

Examples of Resin Production 2 to 4 (Production of Diol Resin Solutions)

Resin syntheses were carried out in the same way as in Example of Production 1 with the raw materials shown in Table 1 and the diol resin solutions D-2 to D-4 shown in Table 1 were obtained. The raw material Cardura E-10 in Table 1 is a mono-glycidyl ester of versatic acid (produced by the Japan Epoxy Resin Co.).

TABLE 1

|  | Example of Resin Production 1 C-1 | Example of Resin Production 2 D-2 | Example of Resin Production 3 D-3 | Example of Resin Production 4 D-4 |
|---|---|---|---|---|
| 1,6-Hexanediol | 561 | 143.5 | 466.5 | 151.9 |
| Adipic acid | 347.1 | 177.5 |  | 187.9 |
| Phthalic anhydride |  |  | 438.7 | 95.2 |
| Cardura E-10 |  | 304 |  | 321.8 |
| ε-Caprolactone |  | 227.2 |  | 146.7 |
| Xylene | 91.9 | 97.8 | 94.8 | 96.5 |
| TOTAL | 1000 | 1000 | 1000 | 1000 |
| Weight average molecular weight | 330 | 700 | 850 | 1,400 |
| Resin solid fraction (Effective component) | 90% | 90% | 90% | 90% |

Example of Resin Production 5 (Production of a Polyester Polyol Resin Solution)

Butylethylpropanediol (187.3 parts), 18.8 parts of trimethylolpropane, 94 parts of 1,6-hexanediol, 31.3 parts of phthalic acid anhydride and 295.2 parts of adipic acid were introduced into a glass flask of capacity 2 L which had been furnished with a thermometer and a stirrer and, after slowly raising the temperature to 140° C., the temperature was raised to 190° C. over a period of 3 hours. The mixture was maintained at 190° C. for 2 hours and then, after the esterification reaction had proceeded, the temperature was raised to 210° C. over a period of 2 hours and the esterification reaction was carried out until the resin acid value fell below 10. The resin so obtained was cooled, 373.4 parts of xylene were added and the polyester polyol resin solution C-1 of weight average molecular weight 14,000, hydroxyl group value 45, acid value 8 and solid fraction 60 mass % was obtained.

Example of Resin Production 6 (Production of a Polyester Polyol Resin Solution)

Resin synthesis was carried out in the same way as in Example of Production 5 with the raw materials shown in Table 2 and the polyester polyol resin solution C-2 shown in Table 2 was obtained.

TABLE 2

|  | Example of Resin Production 1 C-1 | Example of Resin Production 2 C-2 |
|---|---|---|
| Butylethylpropanediol | 187.3 | 35.1 |
| Trimethylolpropane | 18.8 | 58.8 |
| 1,6-Hexanediol | 94.0 | 103.5 |
| Phthalic acid anhydride | 31.3 | 259.6 |
| Adipic acid | 295.2 | 32.0 |
| Cardura E-10 |  | 219.3 |
| Xylene | 373.4 | 291.7 |
| Total | 1000 | 1000 |
| Weight average molecular weight | 14,000 | 3,200 |
| Hydroxyl group value | 45 | 73 |
| Acid value | 8 | 19 |
| Resin solid fraction | 60% | 70% |

Example of Resin Production 7 (Production of an Acrylic Polyol Resin Solution)

Xylene (300 parts) was introduced into a glass flask of capacity 2 L which had been furnished with a thermometer, a stirrer, a reflux condenser and a monomer drip-feed device and the temperature was slowly raised and reflux was achieved. While maintaining the refluxing state, a mixed solution of 180 parts of styrene, 30 parts of methyl methacrylate, 197 parts of stearyl methacrylate, 191.4 parts of Praxel FM-2 (trade name, produced by the Daiseru Kagaku Kogyo Co.; hydroxyethyl methacrylate ester to which 2 mol of ε-caprolactone has been added), 1.8 parts of acrylic acid and 17 parts of polymerization initiator Perbutyl Z (trade name, produced by the Nippon Yushi Co.; t-butyl peroxybenzoate) was added dropwise from the drip-feed device over a period of 3 hours. After the drip-feed had been completed the reflux state was maintained for a further 3 hours and then 1 part of the polymerization initiator Perbutyl Z and 10 parts of xylene were mixed and added dropwise from the drip-feed device. Then, after maintaining the reflux temperature for a further hours and continuing the reaction, 71.8 parts of xylene were added and the mixture was cooled to room temperature and the acrylic polyol resin solution C-3 which had a resin solid fraction of 61 mass % was obtained.

Examples of Resin Production 8 to 12 (Production of Acrylic Polyol Resin Solutions)

Resin syntheses were carried out in the same way as in Example of Production 7 with the raw materials shown in Table 3 and the acrylic polyol resin solutions C-4 to C-8 shown in Table 3 were obtained.

TABLE 3

|  | Example of Resin Production 7 C-3 | Example of Resin Production 8 C-4 | Example of Resin Production 9 C-5 | Example of Resin Production 10 C-6 | Example of Resin Production 11 C-7 | Example of Resin Production 12 C-8 |
|---|---|---|---|---|---|---|
| Styrene | 180.0 |  |  | 60.0 | 60.0 | 90.0 | 90.0 |
| Methyl methacrylate | 30.0 |  | 180.0 | 120.0 |  |  |

TABLE 3-continued

| | Example of Resin Production 7 C-3 | Example of Resin Production 8 C-4 | Example of Resin Production 9 C-5 | Example of Resin Production 10 C-6 | Example of Resin Production 11 C-7 | Example of Resin Production 12 C-8 |
|---|---|---|---|---|---|---|
| Butyl acrylate | | 45.8 | 166.2 | | | |
| Butyl methacrylate | | 276.0 | | 120.0 | 118.2 | 180.0 |
| Isobutyl methacrylate | | | 60.0 | | | 78.6 |
| Ethylhexyl methacrylate | | 150.0 | | 120.0 | | |
| Stearyl methacrylate | 197.0 | | | 101.6 | 180.0 | 60.0 |
| Hydroxyethyl methacrylate | | 43.2 | | | 90.6 | |
| Hydroxypropyl methacrylate | | 75.6 | | | 100.2 | |
| Praxel FM-2 | 191.4 | | 133.8 | 76.8 | | 191.4 |
| Acrylic acid | 1.8 | 9.6 | | 1.6 | 21.4 | |
| Perbutyl Z | 18.0 | 24.0 | 1.8 | 15.6 | 24.0 | 1.2 |
| Xylene | 381.8 | 375.8 | 398.2 | 384.4 | 375.6 | 398.8 |
| Total | 1000.0 | 1000.0 | 1000.0 | 1000.0 | 1000.0 | 1000.0 |
| Weight average molecular weight | 11,000 | 6,200 | 41,000 | 12,200 | 7,100 | 62,000 |
| Hydroxyl group value | 50 | 80 | 35 | 20 | 130 | 50 |
| Acid value | 2 | 13 | 0 | 2 | 29 | 0 |
| Resin solid fraction | 61.0% | 61.0% | 60.0% | 60.5% | 61.5% | 60.0% |

Example of Primer Production 1

Chlorinated polypropylene resin solution (trade name Hardren CY9122, produced by the Toyo Kasei Kogyo Co., maleic anhydride modified chlorinated polypropylene resin, chlorine content 22 mass %, weight average molecular weight from 50,000 to 60,000, resin solid fraction 20%) (487.5 parts), 99 parts of Typake CR-90 (titanium oxide, produced by the Ishihara Sangyo Co.), 0.1 part of pigment black FW200 beads (carbon black, produced by the Degussa Co.) and 0.9 part of TSY-1 (yellow pigment, produced by the Toda Pigment Co.) were introduced into a dispersing container and dispersed until the particle size was less than 15 μm. On reaching the target particle size dispersion was stopped, 40 parts of blocked isocyanate (trade name Desmodur BL3175, produced by the Sumitomo Bayer Co., HDI isocyanate blocked with MEK oxime, NCO content 11.2%, residue on heating 75%), 36.9 parts of the acrylic polyol C-3 produced in Example of Resin Production 7, 5 parts of the diol D-1 produced in Example of Resin Production 1, 0.9 part of dibutyltin dilaurate and 329.7 parts of xylene were added and stirred thoroughly and the Primer P-1 of Example of Primer Production 1 shown in Table 4 was obtained.

Examples of Primer Production 2 to 21

The primers P-2 to P-21 shown in Tables 4 and 5 were obtained in the same way as in Example of Primer Production 1.

TABLE 4

| | | | | Example of Primer Production | | | | | |
|---|---|---|---|---|---|---|---|---|---|
| | | | | P-1 | P-2 | P-3 | P-4 | P-5 | P-6 |
| Primer Compound | Color Pigment | Typake CR-90 1) | | 9.90 | 9.90 | | 9.90 | 9.90 | 9.90 |
| | | Acicular electrically conductive titanium oxide 2) | | | | 9.00 | | | |
| | | Pigment Black FW200 Beads 3) | | 0.01 | 0.01 | | 0.01 | 0.01 | 0.01 |
| | | PRINTEX L 4) | | | | 1.00 | | | |
| | | TSY-1 5) | | 0.09 | 0.09 | | 0.09 | 0.09 | 0.09 |
| | A | Chlorinated PP | Hardren CY9122 6) | 48.75 | 48.75 | 56.25 | 52.50 | 48.75 | 48.75 |
| | | | Superclon 892L 7) | | | | | | |
| | B | Blocked polyisocyanate | Desmodur BL3175 8) | 4.00 | 4.00 | 2.60 | 2.40 | 4.00 | 4.00 |
| | | | Desmodur BL3272MPA 9) | | | | | | |
| | | | Desmodur BL4265SN 10) | | | | | | |
| | C | Polyol Resin | C-1 | | | | 4.50 | | |
| | | | C-3 | 3.69 | 3.69 | 2.95 | | 3.69 | 3.69 |
| | | | C-4 | | | | | | |
| | | | C-5 | | | | | | |
| | D | Diol | Dipropylene glycol | | 0.450 | | | | |
| | | | D-1 | 0.500 | | 0.500 | | 0.500 | 0.500 |
| | | | D-2 | | | | 0.500 | | |
| | | | D-3 | | | | | | |
| | E | Hardening Catalyst | Dibutyltin dilaurate | 0.090 | 0.030 | 0.030 | 0.012 | 0.030 | 0.060 |
| | | | Zinc octylate | | | | 0.018 | | |
| | | | Triethylamine | | | | | | |
| | Other | Epoxy Resin | JER-828EL | | | 1.00 | | | |
| | | Solvent | Xylene | 32.970 | 33.080 | 26.670 | 30.070 | 33.030 | 33.000 |
| | | TOTAL | | 100.00 | 100.00 | 100.00 | 100.00 | 100.00 | 100.00 |

TABLE 4-continued

| Property Values | Mass ratio | A/(A + B + C) | 65 | 65 | 75 | 70 | 65 | 65 |
|---|---|---|---|---|---|---|---|---|
| | | B/(A + B + C) | 20 | 20 | 13 | 12 | 20 | 20 |
| | | C/(A + B + C) | 15 | 15 | 12 | 18 | 15 | 15 |
| | | D/(A + B + C) | 3 | 3 | 3 | 3 | 3 | 3 |
| | | E/(A + B + C) | 0.6 | 0.2 | 0.2 | 0.2 | 0.2 | 0.4 |
| | Polyol Resin | Wt. Ave. Mol. Wt. | 11000 | 11000 | 11000 | 14000 | 11000 | 11000 |
| | | Hydroxyl group value | 50 | 50 | 50 | 45 | 50 | 50 |
| | | Acid value | 2 | 2 | 2 | 8 | 2 | 2 |
| | Diol | Wt. Ave. Mol. Wt. | 330 | 134 | 330 | 700 | 330 | 330 |

| | | | Example of Primer Production | | | | | |
|---|---|---|---|---|---|---|---|---|
| | | | P-7 | P-8 | P-9 | P-10 | P-11 | P-12 |
| Primer Compound | Color Pigment | Typake CR-90 1) | 9.90 | 9.90 | 9.90 | 9.90 | 9.90 | 9.90 |
| | | Acicular electrically conductive titanium oxide 2) | | | | | | |
| | | Pigment Black FW200 Beads 3) | 0.01 | 0.01 | 0.01 | 0.01 | 0.01 | 0.01 |
| | | PRINTEX L 4) | | | | | | |
| | | TSY-1 5) | 0.09 | 0.09 | 0.09 | 0.09 | 0.09 | 0.09 |
| A | Chlorinated PP | Hardren CY9122 6) | 48.75 | 39.00 | 39.00 | 63.75 | | |
| | | Superclon 892L 7) | | | | | 52.50 | 52.50 |
| B | Blocked polyisocyanate | Desmodur BL3175 8) | 4.00 | 7.60 | | | 3.00 | 3.00 |
| | | Desmodur BL3272MPA 9) | | | 2.71 | | | |
| | | Desmodur BL4265SN 10) | | | | 1.62 | | |
| C | Polyol Resin | C-1 | | | | | | |
| | | C-3 | 3.69 | 2.46 | 8.61 | 1.97 | | |
| | | C-4 | | | | | 3.69 | |
| | | C-5 | | | | | | 3.75 |
| D | Diol | Dipropylene glycol | | | | | | |
| | | D-1 | 0.500 | | 0.133 | 1.500 | 1.833 | 0.500 |
| | | D-2 | | | | | | |
| | | D-3 | | 0.200 | | | | |
| E | Hardening Catalyst | Dibutyltin dilaurate | 0.090 | 0.005 | 0.135 | | 0.018 | |
| | | Zinc octylate | | | | 0.180 | | |
| | | Triethylamine | | | | | 0.012 | 0.002 |
| Other | Epoxy Resin | JER-828EL | | | | | | |
| | Solvent | Xylene | 32.970 | 40.736 | 39.414 | 20.985 | 28.947 | 30.248 |
| | | TOTAL | 100.00 | 100.0 | 100.0 | 100.0 | 100.0 | 100.00 |
| Property Values | Mass ratio | A/(A + B + C) | 65 | 52 | 52 | 85 | 70 | 70 |
| | | B/(A + B + C) | 20 | 38 | 13 | 7 | 15 | 15 |
| | | C/(A + B + C) | 15 | 10 | 35 | 8 | 15 | 15 |
| | | D/(A + B + C) | 3 | 1.2 | 0.8 | 9 | 11 | 3 |
| | | E/(A + B + C) | 0.6 | 0.03 | 0.9 | 1.2 | 0.2 | 0.012 |
| | Polyol Resin | Wt. Ave. Mol. Wt. | 11000 | 11000 | 11000 | 11000 | 6200 | 41000 |
| | | Hydroxyl group value | 50 | 50 | 50 | 50 | 80 | 35 |
| | | Acid value | 2 | 2 | 2 | 2 | 13 | 0 |
| | Diol | Wt. Ave. Mol. Wt. | 330 | 850 | 330 | 330 | 330 | 330 |

TABLE 5

| | | | Example of Primer Production | | | | |
|---|---|---|---|---|---|---|---|
| | | | P-13 | P-14 | P-15 | P-16 | P-17 |
| Primer Compound | Color Pigment | Typake CR-90 1) | 9.90 | 9.90 | 9.90 | 9.90 | 9.90 |
| | | Acicular electrically conductive titanium oxide 2) | | | | | |
| | | Pigment Black FW200 Beads 3) | 0.01 | 0.01 | 0.01 | 0.01 | 0.01 |
| | | PRINTEX L 4) | | | | | |
| | | TSY-1 5) | 0.09 | 0.09 | 0.09 | 0.09 | 0.09 |
| A | Chlorinated PP | Hardren CY9122 6) | 28.5 | 26.25 | 71.25 | 33.75 | 39.00 |
| | | Superclon 892L 7) | | | | | |
| B | Blocked polyisocyanate | Desmodur BL3175 8) | 1.00 | 2.00 | 0.40 | 5.00 | 3.00 |
| | | Desmodur BL3272MPA 9) | | | | | |
| | | Desmodur BL4265SN 10) | | | | | |

TABLE 5-continued

|  |  |  |  |  |  |  |  |
|---|---|---|---|---|---|---|---|
| C | Polyol Resin | C-3 | 1.72 | 13.52 | 0.74 |  |  |
|  |  | C-2 |  |  |  |  | 7.07 |
|  |  | C-6 |  |  |  | 7.44 |  |
|  |  | C-7 |  |  |  |  |  |
|  |  | C-8 |  |  |  |  |  |
| D | Diol | D-1 Propylene glycol | 0.50 | 0.50 | 0.50 | 0.50 | 0.50 |
|  |  | D-4 |  |  |  |  |  |
| E | Hardening Catalyst | Dibutyltin dilaurate | 0.030 | 0.030 | 0.030 | 0.030 | 0.030 |
|  |  | Zinc octylate |  |  |  |  |  |
|  |  | Triethylamine |  |  |  |  |  |
| Other | Epoxy Resin | JER-282EL |  |  |  |  |  |
|  | Solvent | Xylene | 48.25 | 47.7 | 17.08 | 43.28 | 40.40 |
|  | TOTAL |  | 100.00 | 100.00 | 100.00 | 100.00 | 100.00 |
| Property Values | Mass ratio | A/(A + B + C) | 38 | 35 | 95 | 45 | 52 |
|  |  | B/(A + B + C) | 55 | 10 | 2 | 25 | 15 |
|  |  | C/(A + B + C) | 7 | 55 | 3 | 30 | 33 |
|  |  | D/(A + B + C) | 3 | 3 | 3 | 3 | 3 |
|  |  | E/(A + B + C) | 0.2 | 0.2 | 0.2 | 0.2 | 0.2 |
|  | Polyol Resin | Wt. ave. Mol. Wt. | 11000 | 11000 | 11000 | 12200 | 3200 |
|  |  | Hydroxyl group value | 50 | 50 | 50 | 20 | 73 |
|  |  | Acid value | 2 | 2 | 2 | 2 | 19 |
|  | Diol | Wt. Ave. Mol. Wt. | 330 | 330 | 330 | 330 | 330 |

|  |  |  |  | Example of Primer Production |  |  |  |
|---|---|---|---|---|---|---|---|
|  |  |  |  | P-18 | P-19 | P-20 | P-21 |
| Primer Compound | Color Pigment | Typake CR-90 1) |  | 9.90 | 9.90 | 9.90 | 9.90 |
|  |  | Acicular electrically conductive titanium oxide 2) |  |  |  |  |  |
|  |  | Pigment Black FW200 Beads 3) |  | 0.01 | 0.01 | 0.01 | 0.01 |
|  |  | PRINTEX L 4) |  |  |  |  |  |
|  |  | TSY-1 5) |  | 0.09 | 0.09 | 0.09 | 0.09 |
|  | A | Chlorinated PP | Hardren CY9122 6) | 52.50 | 52.50 | 56.25 | 56.25 |
|  |  |  | Superclon 892L 7) |  |  |  |  |
|  | B | Blocked polyisocyanate | Desmodur BL3175 8) | 3.00 | 3.00 | 2.60 | 2.60 |
|  |  |  | Desmodur BL3272MPA 9) |  |  |  |  |
|  |  |  | Desmodur BL4265SN 10) |  |  |  |  |
|  | C | Polyol Resin | C-3 |  |  | 2.95 | 2.95 |
|  |  |  | C-2 |  |  |  |  |
|  |  |  | C-6 |  |  |  |  |
|  |  |  | C-7 | 3.66 |  |  |  |
|  |  |  | C-8 |  | 3.75 |  |  |
|  | D | Diol | D-1 | 0.05 |  |  | 2.50 |
|  |  |  | Propylene glycol |  | 0.450 |  |  |
|  |  |  | D-4 |  |  | 0.050 |  |
|  | E | Hardening Catalyst | Dibutyltin dilaurate | 0.030 | 0.030 | 0.001 | 0.300 |
|  |  |  | Zinc octylate |  |  |  |  |
|  |  |  | Triethylamine |  |  |  |  |
|  | Other | Epoxy Resin | JER-282EL |  |  |  |  |
|  |  | Solvent | Xylene | 30.31 | 30.27 | 28.15 | 25.40 |
|  |  | TOTAL |  | 100.00 | 100.00 | 100.00 | 100.00 |
| Property Values | Mass ratio | A/(A + B + C) |  | 70 | 70 | 75 | 75 |
|  |  | B/(A + B + C) |  | 15 | 15 | 13 | 13 |
|  |  | C/(A + B + C) |  | 15 | 15 | 12 | 12 |
|  |  | D/(A + B + C) |  | 3 | 3 | 0.3 | 15 |
|  |  | E/(A + B + C) |  | 0.2 | 0.2 | 0.005 | 2 |
|  | Polyol Resin | Wt. ave. Mol. Wt. |  | 7100 | 62000 | 11000 | 11000 |
|  |  | Hydroxyl group value |  | 130 | 50 | 50 | 50 |
|  |  | Acid value |  | 27 | 2 | 2 | 2 |
|  | Diol | Wt. Ave. Mol. Wt. |  | 330 | 76 | 1400 | 330 |

The significance of the abbreviations and trade names shown in the tables is indicated below.
1) Typake CR-90: Titanium oxide, produced by the Ishihara Sangyo Co.
2) Acicular Electrically Conductive Titanium Oxide: Electrically conductive titanium oxide, produced by the Ishihara Sangyo Co.
3) Pigment Black FW200 Beads: Carbon black, produced by the Degussa Co.
4) PRINTEX L: Electrically conductive carbon black, produced by the Degussa Co.
5) TSY-1: Yellow pigment, produced by the Toda Pigment Co.
6) Hardren CY9122: Produced by the Toyo Kasei Kogyo Co., maleic anhydride modified chlorinated polypropylene resin, chlorine content 22 mass %, weight average molecular weight from 50,000 to 60,000, residue on heating 20%.
7) Superclon 892L: Produced by the Nippon Seishi Chemical Co., maleic anhydride modified chlorinated polypropylene resin, chlorine content 22 mass %, weight average molecular weight from 60,000 to 70,000, residue on heating 20%.
8) Desmodur BL3175 Produced by the Sumitomo Bayer Urethane Co., HDI isocyanurate blocked with MEK oxime, NCO content 11.2 mass %, residue on heating 75 mass %.
9) Desmodur BL3272MPA: Produced by the Sumitomo Bayer Urethane Co., HDI isocyanurate blocked with $\epsilon$-caprolactam, NCO content 10.2 mass %, residue on heating 72 mass %.
10) Desmodur BL4265SN: Produced by the Sumitomo Bayer Urethane Co., IPDI isocyanurate blocked with MEK oxime, NCO content 8.9 mass %, residue on heating 65 mass %.

Example of Top-Coat Paint Production 1 (Two-Liquid Type Urethane Resin Paint for One-Coat Purposes)

Acrylic resin LB-9020 (produced by the BASF Coatings Japan Co., residue on heating 55 mass %, hydroxyl group value 56 mgKOH/g) (45.5 parts), 24 parts of Typake CR-90 (titanium oxide, produced by the Ishihara Sangyo Co.), 0.1 part of Pigment Black FW200 beads (carbon black, produced by the Degussa Co,) and 0.6 part of TSY-1 (yellow pigment, produced by the Toda Pigment Co.) were introduced into a dispersing container and dispersed until the particle size was less than 10 µm. On reaching the target particle size dispersion was stopped and the material was taken out into 0.2 part of the surface controlling agent Modaflow (produced by the Monsanto Co., acrylic copolymer, residue on heating 100 mass %), 10 parts of xylene and 13.2 parts of butyl acetate and stirred thoroughly to uniformity in a Disper to prepare the main component of the two-liquid top-coat paint T-1 for one-coat purposes. Sumidure N75 (produced by the Sumitomo Bayer Co., polyisocyanate resin, residue on heating 75 mass %, NCO content 16.5 mass %) was used as the hardening agent and this was mixed in the proportions of 93.6 parts of the main component and 6.4 parts of the hardening agent and stirred until the mixture was uniform immediately before coating and then used.

Example 2 of Top-Coat Paint Production (Base-Coat Paint for Two-Coat Purposes)

Acrylic resin LB-9020 (produced by the BASF Coatings Japan Co., residue on heating 55 mass %, hydroxyl group value 56 mgKOH/g) (45.5 parts), 6 parts of the rheology control agent LC-0988 (produced by the BASF Coatings Japan Co., inorganic system, residue on heating 10 mass %), 2.5 parts of the aluminum flake pigment Alpaste TCR3040 (trade name, produced by the Toyo Aluminum Co., residue on heating 80 mass %, average particle diameter ($D_{50}$) 17 µm, average thickness 0.8 µm), 3 parts of Alpaste 6340NS (trade name, produced by the Toyo Aluminum Co., residue on heating 71 mass %, average particle diameter ($D_{50}$) 13 µm, average thickness 0.29 µm), 3.3 parts of Desmodur BL3175 (trade name, produced by the Sumitomo Bayer Urethane Co., HDI isocyanurate blocked with MEK oxime, NCO content 11.2 mass %, residue of heating 75 mass %), 0.2 part of the surface control agent Modaflow (produced by the Monsanto Co., acrylic copolymer, residue on heating 100%), 10 parts of xylene and 29.5 parts of butyl acetate were mixed together and stirred for 10 minutes in a Disper to provide a uniform mixture and prepare the one-liquid type metallic base-coat paint for two-coat purposes T-2.

Examples of Top-Coat Paint Production 3 and 4 (Base-Coat Paints for Two-Coat Purposes)

The one-liquid type metallic base-coat paints for two-coat purposes T-3 and T-4 shown in Table 6 were prepared in the same was as in Example of Top-coat Paint Production 2.

Example of Top-Coat Paint Production 5 (Base-Coat Paint for Two-Coat Purposes)

The main component of the two-liquid type metallic base-coat for two-coat purposes T-5 was prepared by mixing the raw materials shown in Table 4 except for the Sumidure N75 and stirring uniformly in the same way as in Example of Top-coat Paint Production 2. Sumidure N75 as the hardening agent was mixed in the proportions of 96.5 parts of the main component and 3.5 parts of hardening agent immediately before coating, stirred until uniform and used.

Example of Top-Coat Paint Production 6 (Colored Base-Coat Paint for Three-Coat Purposes)

The main component of a two-liquid type colored base-coat coat for three-coat purposes T-6 was prepared by dispersing the pigment shown in Table 6 and adding the remaining raw materials except for the Sumidure N75 in the same way as in Example of Top-coat Paint Production 1 and stirring uniformly. Sumidure N75 as the hardening agent was mixed in the proportions of 96.5 parts of the main component and 3.5 parts of hardening agent immediately before coating, stirred until uniform and used.

Example of Top-Coat Paint Production 7 (Colored Base-Coat Paint for Three-Coat Purposes)

The pigment shown in Table 6 was dispersed and the remaining raw materials were added and stirred uniformly in the same way as Example of Top-coat Paint Production 6 to prepare the one-liquid type colored base-coat coat for three-coat purposes T-7.

TABLE 6

| | | Example of Top-coat Paint Production | | | | | | | | | |
|---|---|---|---|---|---|---|---|---|---|---|---|
| | | T-1 | T-2 | T-3 | T-4 | T-5 | T-6 | T-7 | T-8 | T-9 | T-10 |
| Color Pigment | Typake CR-90 | 24.0 | | | | | 22.9 | 22.9 | | | |
| | Pigment Black FW200 beads | 0.1 | | | | | 0.1 | 0.1 | | | |
| | TSY-1 | 0.6 | | | | | | | | | |
| Pearl Pigment | Iriodin 103WNT 11) | | | | | | | | 3.0 | 3.0 | |
| Aluminum | Alpaste TCR-3040 12) | | 2.5 | 2.5 | 2.5 | 2.5 | | | | | |
| Pigment | Alpaste 6340NS 13) | | 3.0 | 3.0 | 3.0 | 3.0 | | | | | |

TABLE 6-continued

|  |  | Example of Top-coat Paint Production | | | | | | | | | |
|---|---|---|---|---|---|---|---|---|---|---|---|
|  |  | T-1 | T-2 | T-3 | T-4 | T-5 | T-6 | T-7 | T-8 | T-9 | T-10 |
| Acrylic Resin Solutions | LB9020 | 45.5 | 45.5 | 45.5 | 45.5 | 45.5 | 45.5 | 45.5 | 45.5 | 45.5 | |
|  | LB9040 | | | | | | | | | | 80.0 |
| Rheology control agent | LC-0988 | | 6.0 | 6.0 | 6.0 | 6.0 | 6.0 | 6.0 | 6.0 | 6.0 | |
| Blocked polyisocyanate | Desmodur BL3175 8) | | 3.3 | | | | | | 3.3 | | |
| Polyisocyanate | Sumidure N75 14) | 6.4 | | | | 3.5 | 3.5 | | 3.5 | | 15.0 |
| Melamine resin | Yuban 122 15) | | | 4.2 | | | | | | | |
| Surface control agent | Modaflow 16) | 0.2 | 0.2 | 0.2 | 0.2 | 0.2 | 0.2 | 0.2 | 0.2 | 0.2 | 0.2 |
| Solvent | Xylene | 10.0 | 10.0 | 10.0 | 10.0 | 10.0 | 10.0 | 10.0 | 10.0 | 10.0 | |
|  | Butyl acetate | 13.2 | 29.5 | 28.7 | 32.8 | 29.3 | 11.8 | 12.0 | 31.8 | 32.0 | 4.8 |
|  | Total | 100.0 | 100.0 | 100.0 | 100.0 | 100.0 | 100.0 | 100.0 | 100.0 | 100.0 | 100.0 |

Example of Top-Coat Paint Production 8 (Pearl Base Coat Paint for Three-Coat Purposes)

The main component of the two-liquid type pearl base-coat coat for three-coat purposes T-8 was prepared in the same way as in Example of Top Coat Paint Production 5 except that the aluminum pigment was replaced with a pearl pigment. Sumidure N-75 as the hardening agent was mixed in the proportions of 96.5 parts of the main component and 3.5 parts of hardening agent immediately before coating, stirred until uniform and used.

Example of Top-Coat Paint Production 9 (Pearl Base Coat Paint for Three-Coat Purposes)

The one-liquid type pearl base-coat coat for three-coat purposes T-9 was prepared in the same way as in Example of Top Coat Paint Production 2 except that the aluminum pigment was replaced with pearl pigment.

Example of Top-coat Paint Production 10 (Clear Paint)

The surface control agent Modaflow (0.2 part) and 4.8 parts of butyl acetate were mixed with 80 parts of the acrylic resin LB-9040 (produced by the BASF Coatings Japan Co., residue of heating 55 mass %, hydroxyl group value 78 mgKOH/g) and stirred for minutes in a Disper to prepare the uniform main component of the two-liquid type clear paint T-10. Sumidure N-75 as the hardening agent was mixed in the proportions of 85 parts of the main component and parts of hardening agent immediately before coating, stirred until uniform and used.

TABLE 7

|  |  |  | Example | | | | | | |
|---|---|---|---|---|---|---|---|---|---|
|  |  |  | 1 | 2 | 3 | 4 | 5 | 6 | 7 |
| Primer |  |  | P-1 | P-2 | P-3 | P-4 | P-5 | P-6 | P-7 |
| Primer Property Values | Mass % Ratio | A/(A + B + C) | 65 | 65 | 75 | 70 | 65 | 65 | 65 |
|  |  | B/(A + B + C) | 20 | 20 | 13 | 12 | 20 | 20 | 20 |
|  |  | C/(A + B + C) | 15 | 15 | 12 | 18 | 15 | 15 | 15 |
|  |  | D/(A + B + C) | 3 | 3 | 3 | 3 | 3 | 3 | 3 |
|  |  | E/(A + B + C) | 0.2 | 0.6 | 0.2 | 0.2 | 0.2 | 0.4 | 0.6 |
|  | Polyol Resin | Wt. Ave. Mol. Wt. | 11000 | 11000 | 11000 | 14000 | 11000 | 11000 | 11000 |
|  |  | Hydroxyl group value | 50 | 50 | 50 | 45 | 50 | 50 | 50 |
|  |  | Acid value | 2 | 2 | 2 | 8 | 2 | 2 | 2 |
|  | Diol | Wt. Ave. Mol. Wt | 330 | 134 | 330 | 700 | 330 | 330 | 330 |
| Top Coat | 1 coat | Two-liquid type Paint No. | T-1 | | | | | | |
|  | 2-coat | Base-coat Composition No. | | T-2 | T-3 | T-4 | T-5 | | |
|  |  | Two-liquid clear paint | | T-10 | T-10 | T-10 | T-10 | | |
|  | 3-coat | Colored base-coat | | | | | | T-6 | T-7 |
|  |  | Pearl base-coat | | | | | | T-8 | T-9 |
|  |  | Two-liquid clear paint | | | | | | T-10 | T-10 |
| Results of Evaluation | Primer Properties | Storage Stability | ◯ | ◯ | ◯ | ◯ | ◯ | ◯ | ◯ |
|  |  | Coating operability | ◯ | ◯ | ◯ | ◯ | ◯ | ◯ | ◯ |
|  | Adhesion of First Top-coat | Base/Primer | ◯ | ◯ | ◯ | ◯ | ◯ | ◯ | ◯ |
|  |  | Primer/Top-coat | ◯ | ◯ | ◯ | ◯ | ◯ | ◯ | ◯ |
|  | Adhesion of Re-coat paint film | 100° C. × 40 min + 80° C. × 20 min. | ◯ | ◯ | ◯ | ◯ | ◯ | ◯ | ◯ |

TABLE 7-continued

|  |  |  | Example |  |  |  |  |
|---|---|---|---|---|---|---|---|
|  |  |  | 8 | 9 | 10 | 11 | 12 |
| Primer |  |  | P-8 | P-9 | P-10 | P-11 | P-12 |
| Primer Property Values | Mass % Ratio | A/(A + B + C) | 52 | 52 | 85 | 70 | 70 |
|  |  | B/(A + B + C) | 38 | 13 | 7 | 15 | 15 |
|  |  | C/(A + B + C) | 10 | 35 | 8 | 15 | 15 |
|  |  | D/(A + B + C) | 1.2 | 0.8 | 9 | 11 | 3 |
|  |  | E/(A + B + C) | 0.03 | 0.9 | 1.2 | 0.2 | 0.012 |
|  | Polyol Resin | Wt. Ave. Mol. Wt. | 11000 | 11000 | 11000 | 6250 | 41000 |
|  |  | Hydroxyl group value | 50 | 50 | 50 | 80 | 35 |
|  |  | Acid value | 2 | 2 | 2 | 13 | 0 |
|  | Diol | Wt. Ave. Mol. Wt | 850 | 330 | 330 | 330 | 330 |
| Top Coat | 1 coat | Two-liquid type Paint No. |  |  |  |  |  |
|  | 2-coat | Base-coat Composition No. | T-2 | T-2 | T-2 | T-2 | T-2 |
|  |  | Two-liquid clear paint | T-10 | T-10 | T-10 | T-10 | T-10 |
|  | 3-coat | Colored base-coat |  |  |  |  |  |
|  |  | Pearl base-coat |  |  |  |  |  |
|  |  | Two-liquid clear paint |  |  |  |  |  |
| Results of Evaluation | Primer Properties | Storage Stability | ○ | ○ | ○ | ○ | ○ |
|  |  | Coating operability | ○ | ○ | ○ | ○ | ○ |
|  | Adhesion of First Top-coat | Base/Primer | ○ | ○ | ○ | ○ | ○ |
|  |  | Primer/Top-coat | ○ | ○ | ○ | ○ | ○ |
|  | Adhesion of Re-coat paint film | 100° C. × 40 min + 80° C. × 20 min. | Δ | Δ | Δ | Δ | Δ |

The abbreviations and trade names shown in the tables have the significance indicated below.

11) Iriodin 103WNT: (Produced by the Merck Co., mica pigment)
12) Alpaste TCR3040: Aluminum pigment produced by the Toyo Aluminum Co., residue on heating 80 mass %, average particle diameter ($D_{50}$) 17 μm
13) Alpaste 6340NS (Aluminum pigment produced by the Toyo Aluminum Co., residue on heating 71 mass %, average particle diameter ($D_{50}$) 13 μm
14) Sumidure N-75: Produced by the Sumitomo Bayer Urethane Co., polyisocyanate resin, residue on heating 75%, NCO content 16.5 mass %
15) Yuban 122: Produced by the Mitsui Kagaku Co., butylated melamine resin, residue on heating 60 mass %
16) Modaflow: Produced by the Monsanto Co., acrylic copolymer, residue on heating 100 mass %

Example 1

Using P-1 as the primer and T-1 as the top-coat paint, tests were carried out in respect of the primer storage stability, the primer coating operability, the adhesion of the first top-coat after coating with the top-coat paint and the adhesion of the recoated top-coat paint on the first top-coat paint on the basis of the methods for the evaluation of paints and paint films described above, and the results of the evaluations are shown in Table 7.

Examples 2 to 12

Tests were carried out substantially in the same way as in Example 1 except that the top-coat paint was replaced with the combinations shown in Table 7, and the results of the evaluations are shown in Table 7.

Comparative Examples 1 to 9

Tests were carried out substantially in the same way as in Example 1 except that the top-coat paint was replaced with the combinations shown in Table 8, and the results of the evaluations are shown in Table 8.

TABLE 8

|  |  |  | Comparative Example |  |  |  |  |  |  |  |  |
|---|---|---|---|---|---|---|---|---|---|---|---|
|  |  |  | 1 | 2 | 3 | 4 | 5 | 6 | 7 | 8 | 9 |
| Primer |  |  | P-13 | P-14 | P-15 | P-16 | P-17 | P-18 | P-19 | P-20 | P-21 |
| Primer Property Values | Mass % Ratio | A/(A + B + C) | 38 | 35 | 95 | 45 | 52 | 70 | 70 | 75 | 75 |
|  |  | B/(A + B + C) | 55 | 10 | 2 | 25 | 15 | 15 | 15 | 13 | 13 |
|  |  | C/(A + B + C) | 7 | 55 | 3 | 30 | 33 | 15 | 15 | 12 | 12 |
|  |  | D/(A + B + C) | 3 | 3 | 3 | 3 | 3 | 3 | 3 | 0.3 | 15 |
|  |  | E/(A + B + C) | 0.2 | 0.2 | 0.2 | 0.2 | 0.2 | 0.2 | 0.2 | 0.005 | 2 |

TABLE 8-continued

| | | | Comparative Example | | | | | | | | |
|---|---|---|---|---|---|---|---|---|---|---|---|
| | | | 1 | 2 | 3 | 4 | 5 | 6 | 7 | 8 | 9 |
| Top Coat | Polyol Resin | Wt. Ave. Mol. Wt. | 11000 | 11000 | 11000 | 12200 | 3200 | 7100 | 62000 | 11000 | 11000 |
| | | Hydroxyl group value | 50 | 50 | 50 | 20 | 73 | 130 | 50 | 50 | 50 |
| | | Acid value | 2 | 2 | 2 | 2 | 19 | 27 | 2 | 2 | 2 |
| | Diol | Wt. Ave. Mol. Wt | 330 | 330 | 330 | 330 | 330 | 330 | 76 | 1400 | 330 |
| | 1 coat | Two-liquid type Paint No. | | | | | | | | | |
| | 2-coat | Base-coat Composition No. | T-2 | T-2 | T-2 | T-2 | T-2 | T-2 | T-2 | T-2 | T-2 |
| | | Two-liquid clear paint | T-10 | T-10 | T-10 | T-10 | T-10 | T-10 | T-10 | T-10 | T-10 |
| | 3-coat | Colored base-coat | | | | | | | | | |
| | | Pearl base-coat | | | | | | | | | |
| | | Two-liquid clear paint | | | | | | | | | |
| Results of Evaluation | Primer Properties | Storage Stability | Δ | Δ | ◯ | Δ | ◯ | X | X | ◯ | Δ |
| | | Coating operability | ◯ | ◯ | ◯ | ◯ | ◯ | X | X | ◯ | ◯ |
| | Adhesion of First Top-coat | Base/Primer | X | X | ◯ | X | X | — | — | ◯ | ◯ |
| | | Primer/Top-coat | ◯ | ◯ | Δ | ◯ | ◯ | — | — | ◯ | ◯ |
| | Adhesion of Re-coat paint film | 100° C. × 40 min + 80° C. × 20 min. | — | — | X | — | — | — | — | X | X |

CONCLUSION

Although as shown by Examples 8 to 12 in Table 7 the adhesion of the recoated paint film falls slightly, the level is such that there is no problem in practical terms and the primers of the present invention have excellent storage stability and coating operability and paint films with which there is no problem with the adhesion of the first top-coat paint films and recoated paint film are obtained.

However, in those cases where the (A), (B) and (C) components are outside the scope of the paint claims, as shown in Comparative Examples 1 to 4, the adhesion of the primer with the base material is reduced as in Comparative Examples 1, 2 and 4, or the adhesion of the top-coat paint with the primer is slightly reduced and the adhesion on recoating is inadequate, as in Comparative Example 3. Furthermore, in those cases where the property values of the admixed polyol are outside the scope of the paint claims the adhesion of the primer with the base material is reduced as shown in Comparative Example 5 or the painting operability and storage stability of the primer give rise to problems as shown in Comparative Examples 6 and 7. Furthermore, when the (D) component and the (E) component are outside the present invention the recoating adhesion is inadequate, as shown in Comparative Examples 8 and 9.

From the results outlined above, the primers of this invention have excellent primer storage stability and painting operability and coated objects which have excellent first top-coat paint film adhesion and recoat adhesion can be obtained.

The invention claimed is:

1. A primer, comprising:
   (A) from 50 to 90 mass % of a chlorinated polyolefin resin comprising a chlorine content of from 5 to 50 mass % and a weight average molecular weight of from 1,000 to 100,000,
   (B) from 45 to 5 mass % of a blocked polyisocyanate compound,
   (C) from 45 to 5 mass % of a polyol resin comprising a hydroxyl group value of from 30 to 120 mgKOH/g and a weight average molecular weight of from 5,000 to 50,000,
   (D) from 0.5 to 12 mass % of a diol comprising a weight average molecular weight from 120 to 1,000 and
   (E) from 0.01 to 1.5 mass % of a hardening catalyst, wherein the mass % proportions are based on the total mass of resin solid fractions of (A), (B) and (C).

2. A method of coating a molding, comprising:
   sequentially coating the primer of claim 1 and a top-coat paint on a molding; and
   baking and hardening the applied primer and top-coat paint to form a top-coat paint film.

3. The method of claim 2, wherein the top-coat paint is a one-coat, two-liquid urethane resin paint.

4. The method of claim 2, wherein the top-coat paint film comprises a base-coat paint film and a clear paint film, and at least the clear paint film is obtained by the baking and hardening of a two-liquid, urethane resin paint.

5. The method of claim 2, wherein the top-coat paint film comprises a colored base-coat paint film, a pearl base-coat paint film and a clear paint film, and at least the clear paint film is obtained by the baking and hardening of a two-liquid, urethane resin paint.

6. The method of claim 2, wherein the molding is comprised of plastic.

7. A method of coating a molding comprising:
   sequentially coating the primer of claim 1 and a top-coat paint on a molding;
   baking and hardening the applied primer and top-coat paint to form a top-coat paint film;
   sequentially coating the primer of claim 1 and the top-coat paint onto the top-coat paint film; and
   baking and hardening the applied primer and top-coat paint.

8. A primer, comprising
   (A) from 60 to 80 mass % of a chlorinated polyolefin resin comprising a chlorine content of from 18 to 25 mass % and a weight average molecular weight of from 10,000 to 80,000,
   (B) from 30 to 10 mass % of a blocked polyisocyanate compound,
   (C) from 30 to 10 mass % of a polyol resin comprising a hydroxyl group value of from 40 to 70 mgKOH/g, an acid value of from 0 to 25 mg KOH/g, and a weight average molecular weight of from 7,000 to 20,000,
   (D) from 1.5 to 8 mass % of a diol comprising a weight average molecular weight from 120 to 800 and
   (E) from 0.05 to 0.8 mass % of a hardening catalyst comprising at least one of a tin compound or a zinc compound, wherein the mass % proportions are based on the total mass of resin solid fractions of (A), (B) and (C).

* * * * *